United States Patent
Engel et al.

(10) Patent No.: US 10,561,152 B1
(45) Date of Patent: Feb. 18, 2020

(54) PRODUCT CUT FROM THE THIGH OF A POULTRY ITEM AND A METHOD OF PRODUCING THE SAME

(71) Applicant: Tyson Foods, Inc., Springdale, AR (US)

(72) Inventors: Melissa Lee Engel, Elkins, AR (US); Stephen Lee Martin, Bentonville, AR (US); Robert Ty Baublits, Springdale, AR (US)

(73) Assignee: TYSON FOODS, INC., Springdale, AR (US)

( * ) Notice: Subject to any disclaimer, the term of this patent is extended or adjusted under 35 U.S.C. 154(b) by 0 days.

(21) Appl. No.: 16/244,985

(22) Filed: Jan. 10, 2019

Related U.S. Application Data

(60) Provisional application No. 62/615,288, filed on Jan. 9, 2018.

(51) Int. Cl.
*A22C 21/00* (2006.01)

(52) U.S. Cl.
CPC ...... *A22C 21/0023* (2013.01); *A22C 21/0076* (2013.01)

(58) Field of Classification Search
CPC . A22C 21/00; A22C 21/0023; A22C 21/0069; A22C 21/0076

USPC ................. 452/135, 149, 174, 198
See application file for complete search history.

(56) References Cited

U.S. PATENT DOCUMENTS

| | | | | |
|---|---|---|---|---|
| 3,036,922 A | * | 5/1962 | Saverslak | A22C 21/0069 426/274 |
| 3,057,006 A | * | 10/1962 | Cutrera | A22C 21/0069 452/136 |
| 3,594,189 A | * | 7/1971 | Panattoni | A22C 21/003 426/104 |
| 5,195,924 A | * | 3/1993 | Gagliardi, Jr. | A22B 5/0035 452/149 |
| 5,667,436 A | * | 9/1997 | Gagliardi, Jr. | A22C 17/0006 452/135 |
| 7,029,388 B2 | * | 4/2006 | Gagliardi, Jr. | A22C 21/0023 452/198 |
| 7,134,958 B2 | * | 11/2006 | Gagliardi, Jr. | A22C 21/0023 452/149 |
| 7,857,687 B2 | * | 12/2010 | Gagliardi, Jr. | A23L 13/00 452/174 |
| 8,591,298 B1 | * | 11/2013 | Watson | A22C 21/0084 452/135 |

* cited by examiner

*Primary Examiner* — Richard T Price, Jr.
(74) *Attorney, Agent, or Firm* — Greensfelder, Hemker & Gale, P.C.

(57) ABSTRACT

An article of manufacture, namely a poultry cut food product, and a method of producing the article of manufacture. The article of manufacture includes a portion cut of the thigh of a poultry item or other bird.

12 Claims, 5 Drawing Sheets

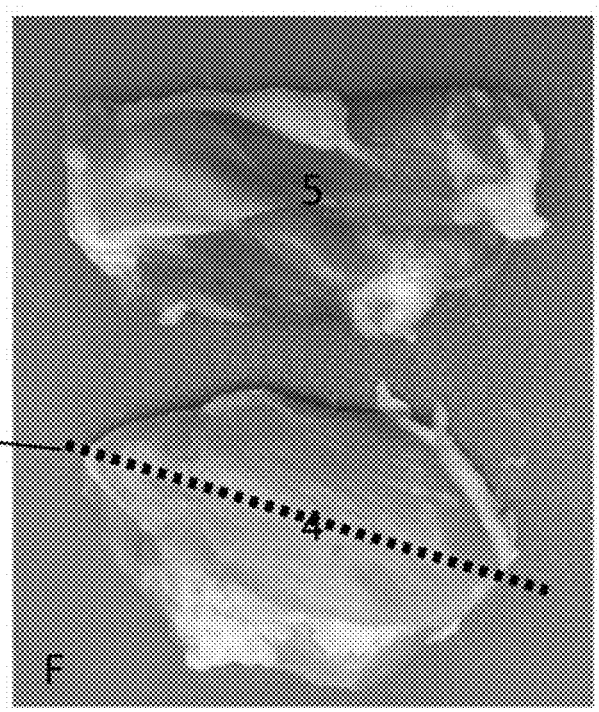
FIG. 7A
FIG. 7B
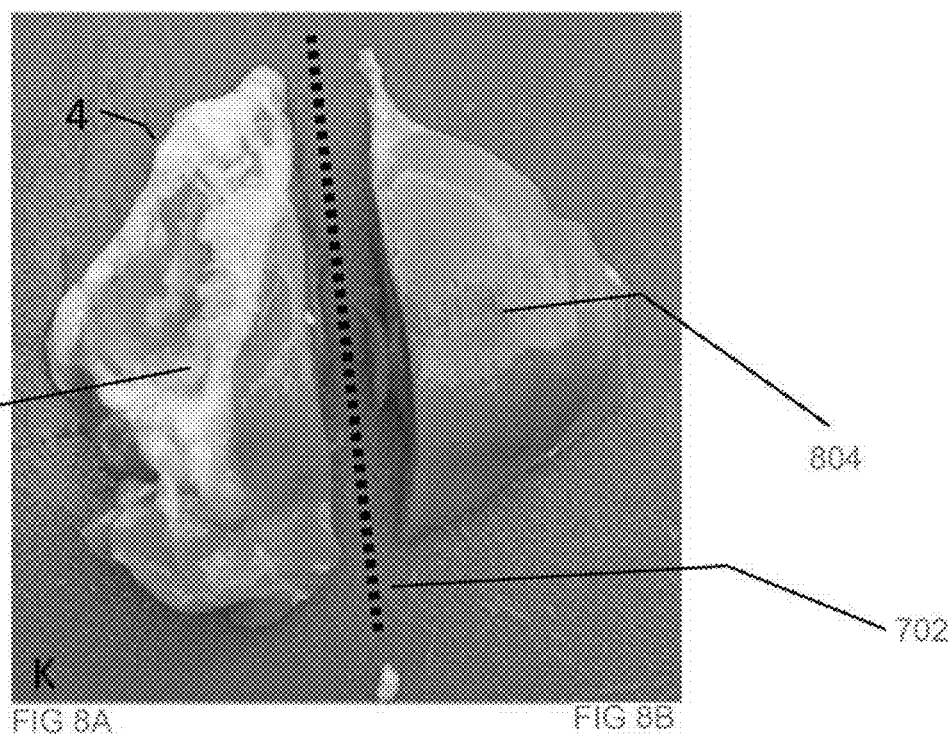
FIG 8A
FIG 8B

PRODUCT CUT FROM THE THIGH OF A POULTRY ITEM AND A METHOD OF PRODUCING THE SAME

BACKGROUND

Field

This technology as disclosed herein relates generally to poultry cuts and, more particularly, to poultry cuts from the thigh muscle of poultry.

Background

In the food industry, there has been an increasing demand for food items that require less time to prepare, items which include little or no waste beyond the consumable item and items that are easy to consume, such as boneless items, and more particularly boneless poultry items. At least one item that has had a particular success are chicken tenders. One possible reason for its success is that it includes little or no waste beyond the consumable item, it is easily consumed and it is boneless. However, one other reason that potentially can be contributed to the success of boneless poultry items is that it is a whole muscle item rather than a fabricated, processed or extruded item. Therefore, the item has the same texture and taste as a whole chicken part without the effort of navigating eating meat off a bone and disposing of the leftover bone.

With regard to a chicken tender, which is the muscle behind the breast meat, it is one of the most expensive poultry item cuts. Therefore, chicken tenders, though boneless, are on the pricier side. Therefore, other whole muscle boneless meat options are needed that are not as pricey as breast meat or tender meat. The lighter meat or white meat is traditionally the pricier item. Therefore, the industry regularly seeks alternative meat sources that are appealing to the customer. Further, poultry meat items that are lighter/whiter in appearance seem to be somewhat more marketable.

An alternative boneless poultry whole muscle item is needed for offering an alternative to boneless chicken tenders and breast and that is more cost effective.

SUMMARY

The technology as disclosed herein includes an article of manufacture, namely a poultry cut food product, and a method of producing the article of manufacture. The article of manufacture includes a portion cut of the thigh of a poultry item or other bird, which includes a muscle component having a partial backbone cutline, a muscle component having a partial leg cutline, a muscle component having a 45 degree cutline beginning under the iliofibularis and extending between the cranial and caudal end of the portion of the thigh cut and said 45 degree cutline angled toward an anterior side of the portion cut creating a bone-in and a boneless portion. The boneless portion cut of the thigh further includes a middle cutline approximately halfway between the 45 degree cutline and an inner edge of the thigh.

One implementation of the technology as disclosed and claimed herein is a method of producing an article of manufacture including cutting and separating a saddle of a poultry item into two separate saddle halves. The method further includes cutting and separating a backbone from one or more of the saddle halves, and cutting and separating the leg portion from the thigh portion. The method further comprising cutting the thigh portion at a 45 degree angle with a cutline extending between the cranial and caudal ends of the thigh portion and the cutline beginning under the iliofibularis and extending toward the anterior side of the thigh portion, thereby separating the thigh into a bone-in and a boneless portion of the thigh. The method further includes cutting and separating the boneless portion of the thigh approximately halfway between the 45 degree cutline and an inner edge of the thigh.

Another implementation of the technology includes a poultry cut product produced by the method of cutting and separating a saddle of a poultry item into two separate saddle halves. The method further includes cutting and separating a backbone from one or more of the saddle halves, and cutting and separating the leg portion from the thigh portion. The method further comprising cutting the thigh portion at a 45 degree angle with a cutline extending between the cranial and caudal ends of the thigh portion and the cutline beginning under the iliofibularis and extending toward the anterior side of the thigh portion, thereby separating the thigh into a bone-in and a boneless portion of the thigh. The method further includes cutting and separating the boneless portion of the thigh approximately halfway between the 45 degree cutline and an inner edge of the thigh.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIGS. 7A and 7B is an anterior view of the portioned thigh separated into a bone-in or deboned and a boneless component; and FIGS. 8A and 8B is an anterior view of a separated boneless component.

Figure 1:
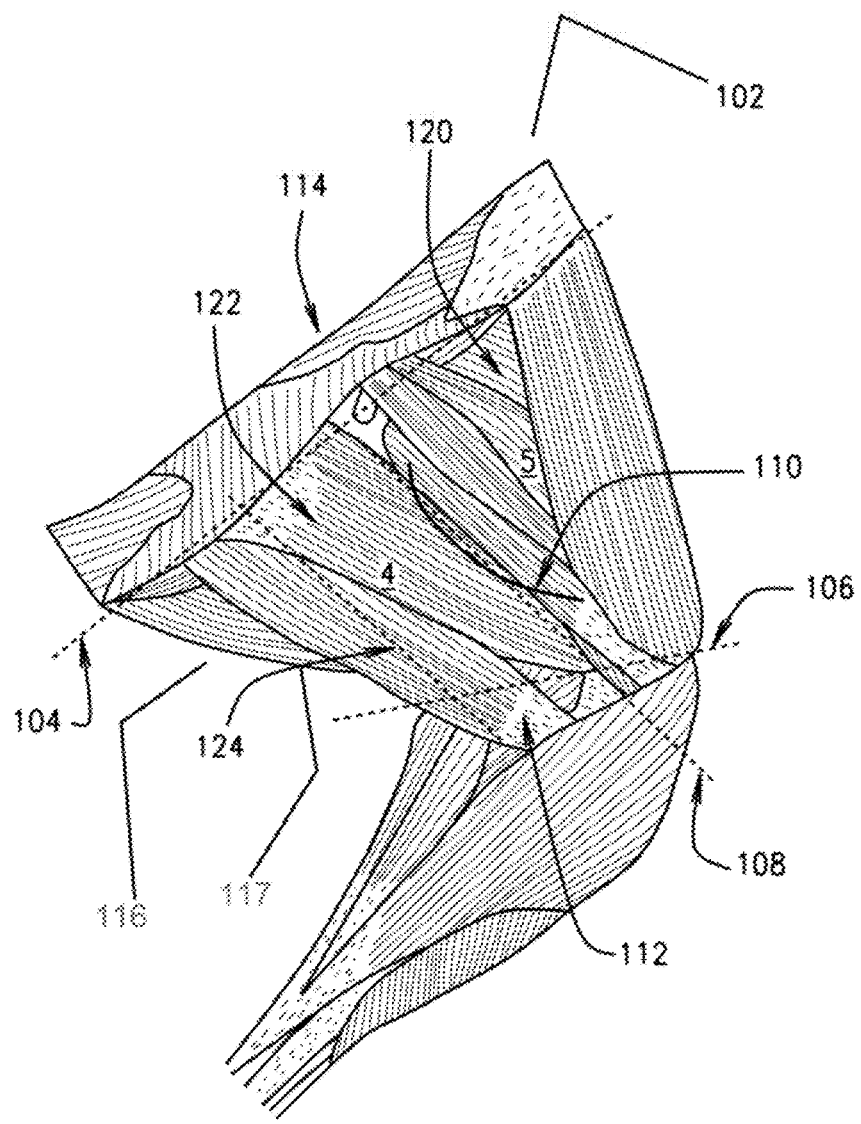
FIG. 1 is a posterior view of a halved saddle cut of a poultry item.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIGS.

1-8 and like reference numerals are being used consistently throughout to refer to like and corresponding parts of the technology for all of the various views and figures of the drawing.

One implementation of the present technology as disclosed comprising a boneless poultry item, teaches a novel boneless poultry product. The details of the technology as disclosed and various implementations can be better understood by referring to the figures of the drawing. Referring to FIG. 1, a posterior view of a halved saddle cut of a poultry item is shown. The technology as disclosed herein includes an article of manufacture, namely, a poultry cut boneless food product, and a method of producing the article of manufacture. During the process of butchering a bird for sale and consumption, in particular a poultry item, the saddle portion of the bird is separated after the hocks have been removed. The saddle portion of the bird includes two opposing drum portions each connected to opposing thigh portions where each thigh portion is connected at a backbone portion. The saddle is further processed by cutting the saddle in half along the backbone 102 resulting in two separated saddle halves. Each saddle half is further processed by removing the backbone resulting in a leg quarter, which includes a drum portion and a thigh portion.

The article of manufacture, which is the primary subject of the invention includes a portion cut of the thigh of a poultry item or other bird, which includes a muscle component having a partial backbone cutline 104, a muscle component having a partial leg cutline 106, a muscle component having a 45 degree cutline 108 beginning under the iliofibularis 110 and extending between the cranial 114 and caudal 112 end of the portion of the thigh cut 116 and said 45 degree cutline 108 is angled toward an anterior side 118 (SEE FIG. 2) of the portion cut creating a bone-in 120 and a boneless portion 122. Please note that the bone-in portion 120 for one implementation is deboned, therefore portion 120 is denoted as a deboned portion 120. The portion cut of the thigh further includes a middle cutline 124 approximately halfway between the 45 degree cutline 108 and the inner edge 117 of the thigh 116.

One implementation of the technology as disclosed and claimed herein is a method of producing an article of manufacture including cutting and separating a saddle of a poultry item into two separate saddle halves. The method further includes cutting and separating a backbone from one or more of the saddle halves with a blade or other cutting implement along a cutline 104, and cutting and separating the leg portion from the thigh portion with a blade along cutline 106. The method further comprising cutting the thigh portion at a 45 degree angle with a blade angled at 45 degrees with respect to horizontal along cutline 108 extending between the cranial and caudal ends of the thigh portion and the cutline beginning under the iliofibularis 110 and extending toward the anterior side 118 of the thigh portion, thereby separating the thigh into a bone-in and a boneless portion of the thigh. The method further includes cutting and separating the boneless portion of the thigh in the direction of the muscle fibers approximately halfway between the 45 degree cutline and the inner edge 117 of the thigh 116. The two boneless halves resulting from cutting the boneless portion along the direction of the muscle fibers provide two lighter whole meat cuts that are similar in appearance to that of a winglet.

Figure 2:
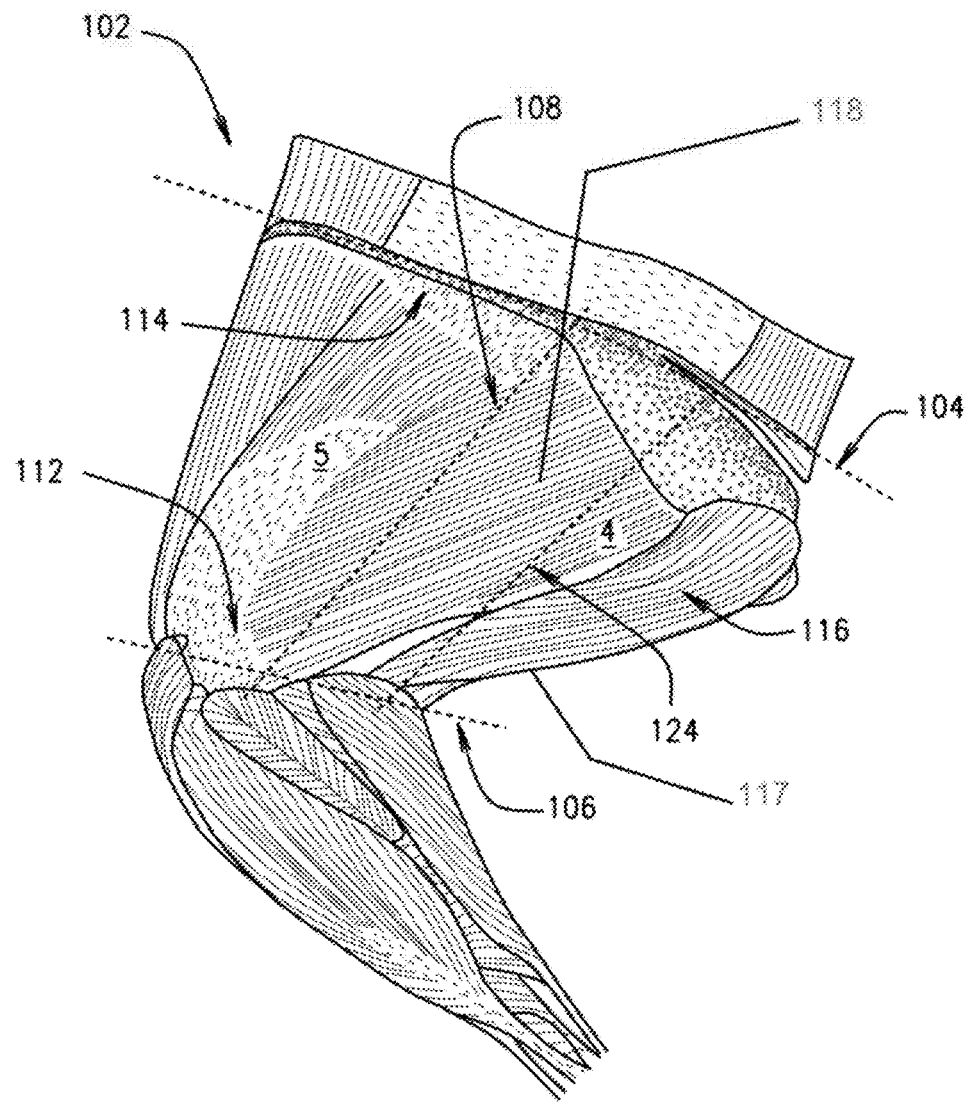
FIG. 2 is an anterior view of a halved saddle cut of a poultry item.

Referring to FIG. 2, an anterior view of a halved saddle cut of a poultry item is shown. The anterior view of the halved saddle cut is illustrated with the skin removed to illustrate the muscle structure of the cut. The anterior side of the thigh area of the cut reveals a portion of the muscle area that is lighter and a portion of the muscle area that is darker. The article of manufacture that is illustrated herein is the cut apportioning the portion of the thigh muscle that is lighter. FIG. 2 also illustrates the cutlines. The article of manufacture, which is the primary subject of the invention that is disclosed and claimed herein, includes a portion cut of the thigh of a poultry item or other bird, which includes a muscle component extending from an inner edge of the thigh, a partial backbone cutline 104, a muscle component having a partial leg cutline 106, a muscle component having a 45 degree cutline 108 beginning under the iliofibularis 110 (SEE FIG. 1) and extending between the cranial 114 and caudal 112 ends of the portion of the thigh cut 116 and said 45 degree cutline 108 is angled toward an anterior side 118 (SEE FIG. 2) of the portion cut creating a bone-in 120 (SEE FIG. 1) and a boneless portion 122 (SEE FIG. 1). Please note again, the bone-in portion 120 for one implementation is deboned. The boneless portion has a lighter coloration, which is the lighter half of the extensor iliotibialis lateralis muscle group. The portion cut of the thigh further includes a middle cutline 124 approximately halfway between the 45 degree cutline 108 and the inner edge 117 of the thigh 116. Therefore the resulting two divided portions, two divided boneless portions, include a portion cut of the thigh of a poultry item or other bird, which includes a muscle component having a partial backbone cutline 104, a muscle component having a partial leg cutline 106, a muscle component having a 45 degree cutline 108 beginning under the iliofibularis 110 (SEE FIG. 1) and extending between the cranial 114 and caudal 112 ends of the portion of the thigh cut 116 and said 45 degree cutline 108 is angled toward an anterior side of the portion cut creating a bone-in 120 (SEE FIG. 1) and a boneless portion 122 (SEE FIG. 1).

Figure 3:
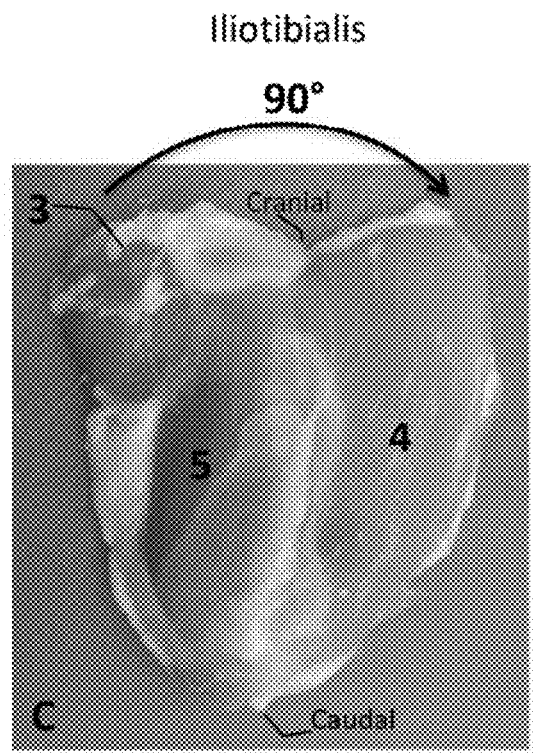
FIG. 3 is an anterior view of the thigh portion of a poultry item.

Referring to FIG. 3, an anterior view of the thigh portion of a, poultry item is shown, where the leg and the back bone has been removed. The thigh cut has a cranial and a caudal end. There is a meat portion that is lighter and one that is darker. The darker portion contains the bone and the lighter portion is boneless. The iliotibialis, or lateral superficial muscle of the chicken thigh 3, includes a visually lighter portion 4 and a visually darker portion 5. The darker portion 5 of the iliotibialis contains the femur bone. The thigh cut is turned to the posterior side to make the 45 degree cut. At approximately a 45 degree angle the thigh is further cut under the iliofibularis toward the femur bone which is in the darker portion of the thigh meat. Please note that FIG. 3 reflects the skin removed, however, for another implementation, the skin is in tact.

Figure 4:
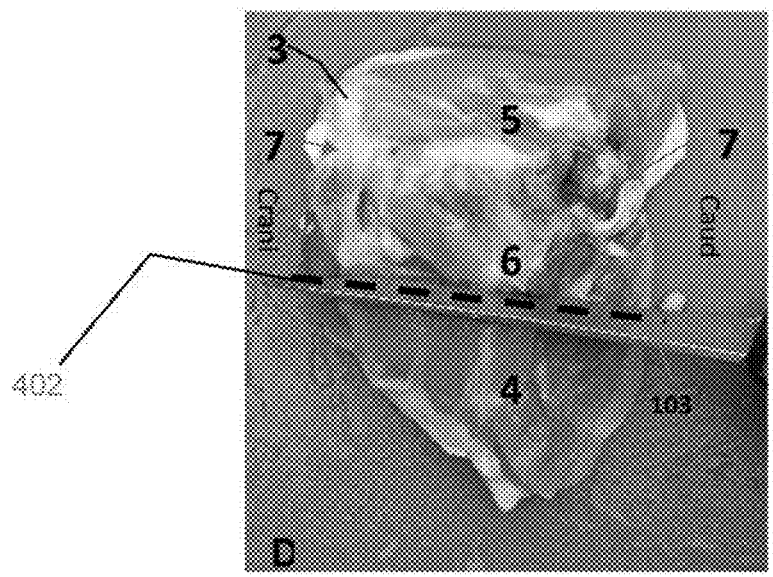
FIG. 4 is a posterior view of the thigh portion of a poultry item.
Figure 5:
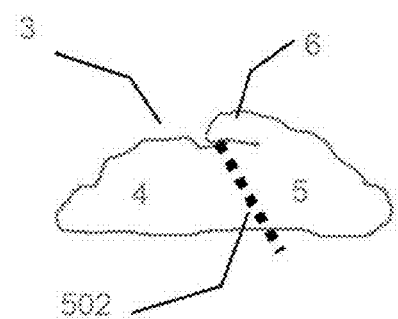
FIG. 5 is a caudal end view of the thigh portion illustrating the 45 degree cut.
Figures 6A, 6B:
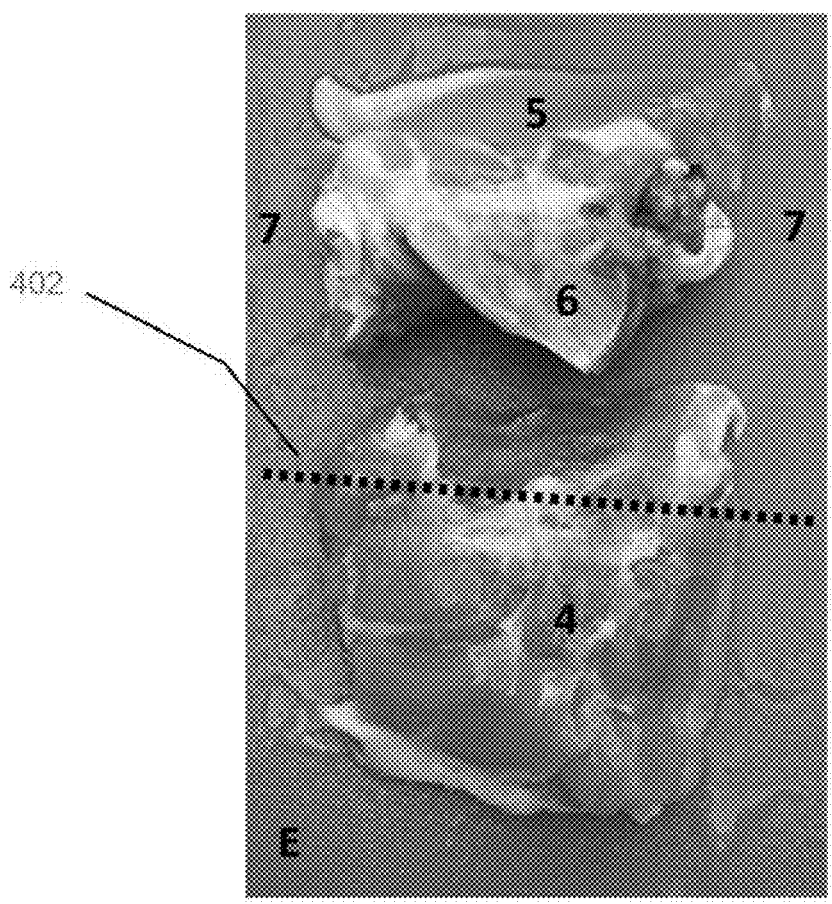
FIGS. 6A and 6B is a posterior view of the portioned thigh separated into a bone-in and a boneless component.

Referring to FIG. 4, a posterior view of the thigh portion 3 of a poultry item is shown. An illustration of the starting point of the cut 402 under the iliofibularis 6 is shown. The ends of the femur bone 7 are also shown providing a perspective of the location of the bone in the bone-in dark portion 5 of the thigh. A blade 103 is illustrated as making the cut beginning along cutline 402. FIG. 5 provides a lateral view, which is from the perspective of the caudal end, of the thigh portion illustrating the 45 degree angle of the cut 502. FIGS. 6A and 6B provide a posterior view of the portioned thigh, portions 4 and 5, separated into a bone-in 5 and a boneless 4 component. However, for one implementation of the cut, the bone-in portion may have already had the bone removed, thereby portion 5 is referred to the de-boned portion 5. Further for one implementation the thigh portion may have the skin removed ("skinless"), as shown, or the natural skin may be intact. FIGS. 7A and 7B provide an anterior view of the portioned thigh separated into a bone-in 5 (or deboned portion if the thigh bone is removed) and a boneless 4 component. The cutline 702 for halving the boneless component is also illustrated. The boneless portion is cut with a blade along the illustrated cutline to completely halve and separate the boneless lighter component into two pieces or two divided boneless portions.

Referring to FIGS. 8A and 8B, an anterior view of a separated boneless component is provided showing the two divided boneless portions. The boneless portion 4 is subdivided into two divided boneless portions 802 and 804 along cutline 702. It should be noted that any of the cuts having the cutlines as described herein or poultry products can be produced from a leg quarter and/or a boneless thigh, for example where the femur bone is removed from the thigh prior making the 45 degree cut to thereby separate the boneless thigh filet into a darker portion where the femur was removed and a lighter portion.

The various product examples shown above illustrate a boneless food item. A user of the present technology as disclosed may choose any of the above implementations, or an equivalent thereof, depending upon the desired application. In this regard, it is recognized that various forms of the subject could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A poultry cut food product comprising:
a portion cut of a thigh of a poultry item or other bird including a muscle component having a partial backbone cutline;
said muscle component having a partial leg cutline; and
said muscle component having approximately a 45 degree cutline beginning under an iliofibularis and extending between a cranial end and a caudal end of the portion of the thigh cut and said approximately 45 degree cutline angled toward an anterior side of the portion cut of the thigh creating a boneless portion.

2. The food product as recited in claim 1 comprising:
said boneless portion including a middle cutline approximately halfway between the approximately 45 degree cutline and an inner edge of a thigh, thereby said boneless portion is subdivided into two divided boneless portions about a middle cutline.

3. A method of producing a poultry cut food product comprising:
cutting and separating a saddle of a poultry item into two separate saddle halves;
cutting and separating a backbone from one or more of the saddle halves thereby leaving a leg portion connected to a thigh portion;
cutting and separating the leg portion from the thigh portion; and
cutting the thigh portion at approximately a 45 degree angle with a cutline extending between a cranial end and a caudal end of the thigh portion and the cutline beginning under an iliofibularis and extending toward an anterior side of the thigh portion, thereby separating the thigh portion into, one of a bone-in portion and a deboned portion, and a boneless portion of the thigh.

4. The method as recited in claim 3, comprising:
cutting and separating the boneless portion of the thigh approximately halfway between the approximately 45 degree cutline and an inner edge of the thigh portion to thereby create two divided boneless portions.

5. The method as recited in claim 4, comprising:
removing the skin from the thigh portion.

6. The method as recited in claim 3, comprising:
removing a thigh bone from the thigh portion.

7. A boneless food product prepared by a process comprising the steps of:
cutting and separating a saddle of a poultry item into two separate saddle halves;
cutting and separating a backbone from one or more of the saddle halves thereby leaving a leg portion and a thigh portion;
cutting and separating the leg portion from the thigh portion; and
cutting the thigh portion at approximately a 45 degree angle with a cutline extending between a cranial end and a caudal end of the thigh portion and the approximately 45 degree cutline beginning under an iliofibularis and extending toward an anterior side of the thigh portion, thereby separating the thigh portion into, one of a bone-in portion and a deboned portion, and a boneless portion of the thigh.

8. The boneless food product prepared by the process of claim 7, where the process further comprises the steps of:
cutting and separating the boneless portion of the thigh approximately halfway between the approximately 45 degree cutline and an inner edge of the thigh portion, thereby creating two divided boneless portions.

9. A method of producing a poultry cut food product comprising:
cutting a thigh portion at approximately a 45 degree angle with a cutline extending between a cranial end and a caudal end of the thigh portion and the cutline beginning under an iliofibularis and extending toward an anterior side of the thigh portion, thereby separating the thigh portion into, one of a bone-in portion and a deboned portion, and a boneless portion of the thigh.

10. The method as recited in claim 9, comprising:
cutting and separating the boneless portion of the thigh portion approximately halfway between the approximately 45 degree cutline and an inner edge of the thigh portion to thereby create two divided boneless portions.

11. The method as recited in claim 10, comprising:
removing a thigh bone from the thigh portion.

12. The method as recited in claim 10, comprising:
removing the skin from the thigh portion.

* * * * *